Jan. 6, 1925. 1,522,121
J. K. M. HARRISON
POWER GENERATION
Filed Nov. 11, 1919 2 Sheets-Sheet 1
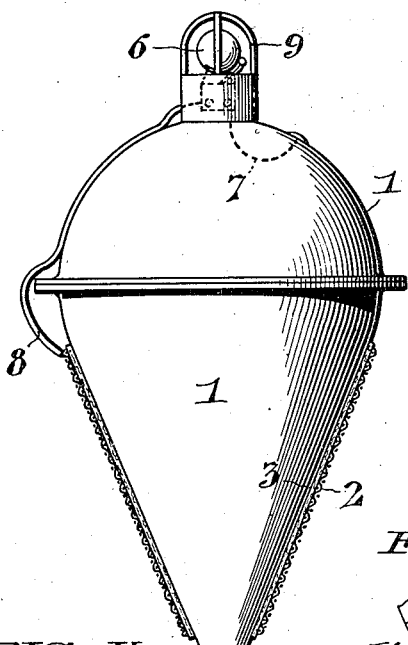
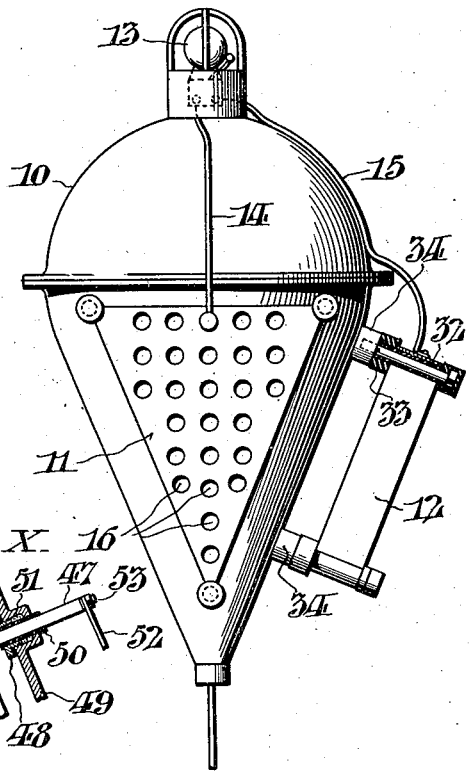
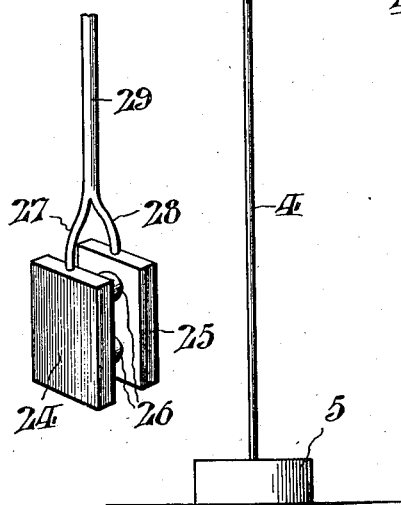
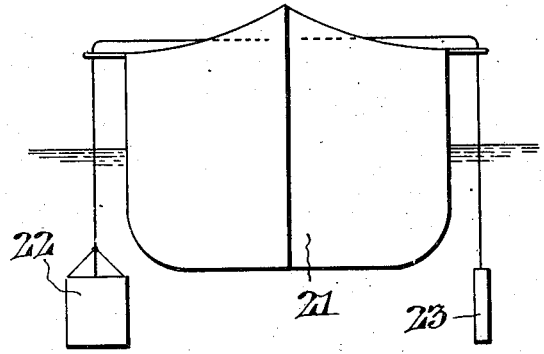
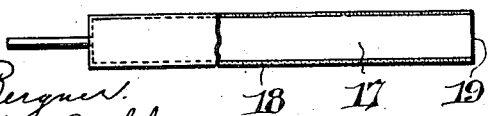
INVENTOR:
John K. M. Harrison,
ATTORNEYS Jan. 6, 1925.
J. K. M. HARRISON
POWER GENERATION
Filed Nov. 11, 1919
1,522,121
2 Sheets-Sheet 2
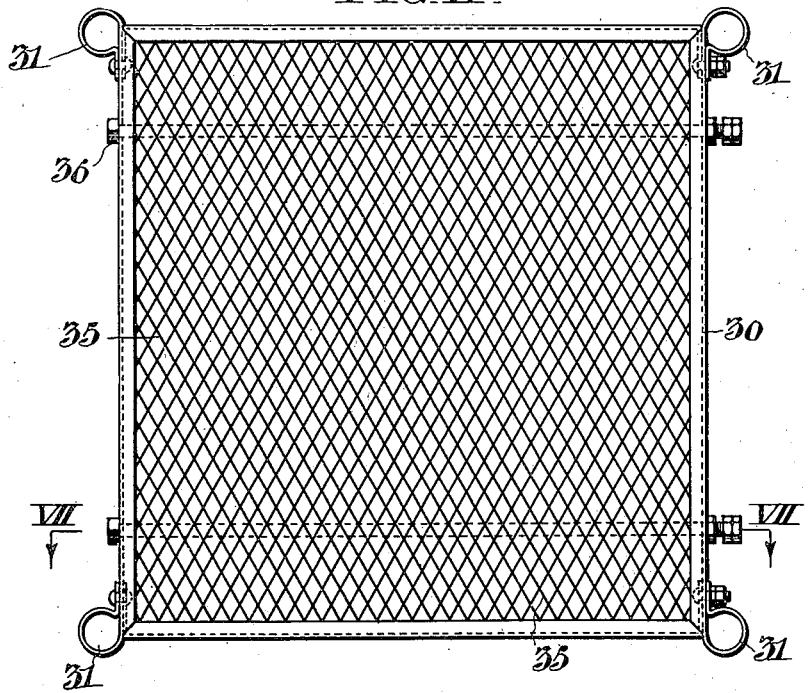
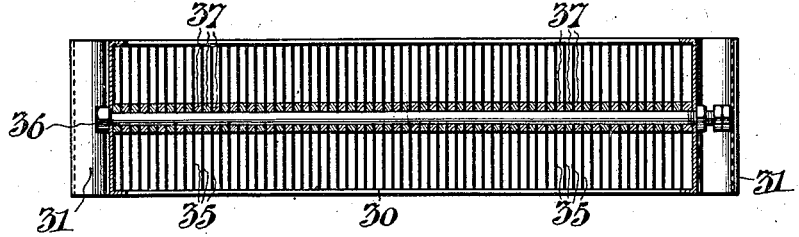
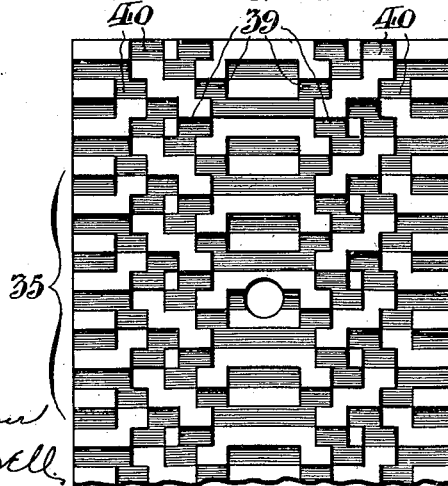
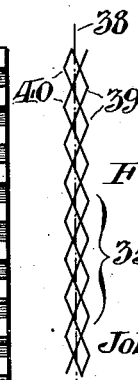
INVENTOR:
John K. M. Harrison
ATTORNEYS.
WITNESSES:

Patented Jan. 6, 1925.

1,522,121

UNITED STATES PATENT OFFICE.

JOHN K. M. HARRISON, OF OGONTZ, PENNSYLVANIA.

POWER GENERATION.

Application filed November 11, 1919. Serial No. 337,219.

*To all whom it may concern:*

Be it known that I, JOHN K. M. HARRISON, a citizen of the United States, and a resident of Ogontz, in the county of Montgomery and State of Pennsylvania, have invented certain new and useful Improvements in Power Generation, of which the following is a specification, reference being had to the accompanying drawings.

My invention relates to power generation, and its main object is the production of electric power in substantial amount in a novel and advantageous manner. The invention is of special utility in cases where moderate amounts of power are to be used at sea in situations where ordinary ways of obtaining it are unavailable or unsatisfactory, or where it is of great importance to have an ever-ready source of such power not subject to derangement or rapid exhaustion, nor to substantial deterioration in periods of disuse. Such situations exist in the case of apparatus for automatic submarine, radio, and other danger signals on ships and on buoys remote from shore, and in the radio-telegraphic apparatus of ships and their life-boats,—where accidents to ordinary power plant, failure of storage-batteries and dry cells seldom used or inspected, etc., may result in appalling disaster and loss of life. Other important fields of use for my invention will readily suggest themselves.

Various advantages obtainable in connection with my invention will appear from the discussion and description hereinafter, while its scope and essentials will be indicated in my claims.

I have discovered that electric power and energy in substantial amount can be obtained by means of what I term a "sea-battery," functioning on the galvanic couple principle with pole elements or electrodes immersed or exposed in the sea water as electrolyte over sufficiently extended areas. The electrodes being immersed directly in the sea itself, the supply of electrolyte is practically unlimited and incapable of exhaustion or deterioration. Hence the voltage and current output can be much more constant over long periods of use than in the case of ordinary galvanic cells; and the life of the battery is limited only by consumption, wastage, or disintegration of the electrodes,—especially the cathode. I have referred to the sea and to sea-water; but it will be apparent that the utility of my sea-battery device extends to other bodies of water.

I am aware that it has heretofore been proposed or even attempted to obtain energy from the sea in a great variety of ways; but so far as I know, such proposals have generally been of an extravagant and visionary character,—often quite inoperative or impracticable, for one reason or another,—and have in no case led to any practical outcome beyond the obtaining of a few milliamperes of current at a voltage not exceeding a couple of hundredths of a volt,—and this only for highly specialized purposes where the supposed demand for current was qualitative merely. By means of a sea-battery constructed in accordance with my invention, I have obtained currents of several amperes and voltages of several volts, or more, and this without making the apparatus of any very considerable size.

As regards the relation between power capacity and areas of exposure of electrodes to electrolyte, the "spread" of the metal surface in reference to the electrolyte seems to be a factor, as well as the area of metal surface in contact with the electrolyte.

That the current and power obtainable should vary with the area of the metal surface in contact with the electrolyte is only what must be expected, since it obviously affects the internal resistance of the battery. The influence of increase in the area of "spread" of the contact surface on current and power would seem to be likewise due to the effect of spread on the internal resistance of the battery,—since increased spread of the contact surface means, generally speaking, increased minimum cross-section of the effective current-carrying "tube" of electrolyte (to use a figure of speech from the theory of magnetic flux) at its end or "base" on the electrode. (These considerations apply in a greater degree to the anode than to the cathode.) Furthermore, I have found that if the contact surface be sufficiently large,—say 10,000 square inches for a copper anode, for example,—the effect of spread becomes so slight as to be of little practical consequence. The internal resistance of the battery being the decisive factor, it is found that the capacity cannot as a practical matter be increased indefinitely by enlarging the electrodes.

Since polarization takes place on the positive pole element or anode, the anode must normally have relatively large exposed area in comparison with what is required for the negative pole element or cathode. While the ratio may vary greatly with different materials and conditions, 10:1 to 5:1 is suitable under ordinary conditions. To a certain extent, however, the necessity for very large anode surface may be offset by so arranging the anode as to take full advantage of the waves as a means of depolarization, or of any other ordinary relative movement of water and anode, such as that arising from the motion of a ship, a buoy, or the like. It will be understood that polarization, being due to chemical decomposition of the electrolyte, increases with electrode spread, but does not increase so rapidly with contact area when spread remains unchanged.

When the battery device is used in connection with a floating structure,—such as a ship, buoy or the like,—this structure itself can often be functionally incorporated in the battery. In this case, it will usually be of advantage to have an exterior or outermost wetted metallic surface of this structure serve as anode, since this affords the advantages of large "spread" and effective depolarization by movement in reference to the water. If this wetted surface of the floating structure be very large,—as in the case of the skin of an iron or steel ship, or of a wooden ship copper sheathed as a protection against fouling or parasite attack,—the effect of polarization will be virtually nil. Generally speaking, however, there is no objection to making the skin or other portion of a floating structure the cathode, because in such a case the electrolytic loss of material will usually be infinitesimal in comparison with the large area of action.

As regards the materials of the exposed electrode surfaces, not only must they be so located in the scale of galvanic potential characteristics as to form a couple of sufficient potential difference; but they must fulfill other requirements arising out of the peculiar conditions of service. Some metals that might otherwise seem available and highly desirable are subject to rapid destruction or wastage in sea-water, even when not in closed circuit; others tend to coat themselves with compounds whose insulating or other properties lower their potential characteristics very seriously. Very expensive metals,—such as gold and platinum, etc.,—are naturally out of the question except in very thin coatings that would be too liable to accidental puncture with resultant destruction of the parts by local electrolytic action, so that their use is excluded in ordinary conditions of service. This factor of local electrolytic action is of great practical importance; it necessitates making all surfaces exposed to the sea-water that are in electrical connection of materials with the same potential characteristics,—which means, practically, making them of the same material. For conditions where accessory parts (such as current leads, for example) cannot be imperviously protected against contact with the sea-water, this factor eliminates from consideration many materials desirable for electrodes simply because they have not the mechanical properties necessary in the accessory parts, or lose these properties under exposure to sea-water. In cases where current leads are of different material from their corresponding electrodes, they must be kept from exposure up to and including their very junctions with the electrodes, as well as for the rest of their length.

The electrode materials which I have found to answer varying requirements to the best advantage are magnesium, zinc, iron and steel, copper, molybdenum, tungsten, and carbon,—here ranged in the reverse order of magnitude of their galvanic potential characteristics in sea-water as electrolyte, so that each is electropositive with reference to all following it, and vice versa. Magnesium is subject to such wastage in sea-water (a point already referred to) as ordinarily forbids its use without special precautions such as will be indicated hereinafter. Zinc, indeed, tends (under certain conditions, at least) to coat itself with compounds that lower its potential characteristic somewhat, as mentioned above; but even with its deteriorated potential characteristic, it still holds its place on the negative side of iron and steel, and it does not seem to form such a coating so long as current is actually being taken from the battery. Its ease of application as an impervious coating on iron and steel combined with the anti-corrosive protection it affords them give it a peculiar value where long immersion and great power on one single brief occasion of use are the desiderata. Iron and steel are useful on account of their cheapness and mechanical properties, and hence most valuable where very extended area of exposure combined with moderate voltage are desired and satisfactory; their presence in the hulls of ships and other marine structures also gives them special importance.

Not only has copper well-known useful mechanical and electrical properties, (which make is especially desirable for current leads and the like), and the advantage of freedom from destruction and deterioration by corrosion, disintegration, or wastage in sea-water, but I have found that it has also an advantage which (so far as I know) is as unique as it is unexpected in view of its known properties: with exposure to sea-water, its potential characteristic and current yield for a given area gradually improve some 20%. Whether this is due to a greenish salt (probably a basic chloride with some sulphate) that seems to form on the metal, or to other causes, I cannot say; but my observation leaves no doubt as to the fact.

Carbon is valuable for its cheapness as well as for its high potential characteristic, and it has the advantage of being easily produced with a naturally cellular or porous structure, which give it great virtual exposed surface. The fineness of its foraminous interstices has, however, a disadvantage in the difficulty and slowness with which, being anode, it depolarizes after current flow has been stopped by opening of the battery circuit: this seems to be due to capillary trapping of the polarizing gas in its pores. Its best field of use, therefore, is in cases where intermittent current flow is desired, so that short periods of activity alternate with relatively long intervals of rest. Movement of the sea-water seems to have no depolarizing effect upon it.

Tungsten and molybdenum are valuable for their very high potential characteristics,—an advantage which in many cases may be offset by their relatively high cost. The potential characteristic of tungsten, in particular, is phenomenally high in comparison with other non-precious commercial metals; and when it is used in sea-water, the rapid deterioration which it suffers in ordinary water (in consequence of absorbed or occluded oxygen) does not occur.

In the drawings, Fig. I, is a somewhat diagrammatic view illustrating a sea battery in accordance with my invention applied in a channel-marking buoy.

Fig. II, shows another channel-marking buoy organization.

Fig. III, shows an arrangement for the use of rapidly disintegrating metal in an electrode.

Fig. IV, shows a sea-battery combination in which the hull of a steel ship may be utilized as one electrode.

Fig. V, shows still another form of battery device.

Fig. VI, is an enlarged front view of an electrode or pole element device shown in Fig. II, somewhat diagrammatic.

Fig. VII, shows a section of the device of Figs. II and VI, at a plane corresponding to the line VII—VII, in Fig. VI.

Fig. VIII, is a greatly enlarged fragmentary view of one of the plate elements of the electrode device.

Fig. IX, is a corresponding edge view of a plate element.

Fig. X, is a fragmentary detail view illustrating a current connection for a carbon electrode.

The battery organization shown in Fig. I, comprises a floating channel marking buoy 1, functionally incorporated in the battery as explained above. As shown, the exterior wetted surface of the buoy 1, comprises a foraminous metallic sheet 2, in the form of a netting of wire (say 18 gauge B. & S.) suitably stretched and secured over the skin plating of the buoy, and electrically insulated therefrom by a suitable interposed layer or coating 3, which may be made of canvas in one or more plies in order to be freely permeable by the sea-water. The buoy 1, may be of the ordinary type and dimensions with a skin or shell of sheet metal, and may be secured by a wire or chain cable 4, to an anchor 5, according to the usual practice, so that buoy, cable, and anchor are all in electrical connection with one another. A low voltage marine electric bell 6, is connected in circuit between wire netting 2, and buoy shell 1, as electrodes by means of leads 7 and 8, the latter suitably insulated and armored to protect it and prevent short circuits. An enclosure 9, of any usual type may surround the bell 6.

It will be seen that both of the electrodes 1 and 2, are freely exposed to be wetted and washed by the seawater. If buoy 1, cable 4, and anchor 5, be of steel, as usual, and the wire netting 2, of copper, the latter will form an anode of large contact area and spread, arranged in the most advantageous manner possible for taking advantage of depolarization by the waves. The exposed steel cathode surface including buoy 1, cable 4, and anchor 5, will also be ample, and the loss by electrolytic action will be evenly distributed over the buoy. Moreover, the amount of copper required is relatively small.

In Fig. II, the channel buoy 10, carries a separate battery device comprising electrodes 11 and 12, insulatively mounted thereon, the electric bell 13, being connected in circuit between them by cables 14 and 15. The electrode 11, is shown as in the form of a heavy triangular zinc plate (amalgamated, if preferred), 18″ or more on a side and 3″ thick, made foraminous or honeycombed by a hundred or more ½″ holes 16,—here exaggerated in size for the sake of clearness of illustration. This "grid" 11, is attached to the buoy 10, in the same way as the electrode 12,—as hereinafter described,—and constitutes the cathode, so that great mass of metal is desirable in it rather than extreme area of exposed surface. The anode 12, may be of copper: its preferred mode of construction is described hereinafter.

Fig. III, shows a bar 17, of magnesium or other metal subject to rapid disintegration in water with an impervious coat 18, of marine glue or other insulating material insoluble in water. As shown, the coating 18, leaves the end 19, of the bar exposed, which affords sufficient surface for its action as cathode while preventing the general disintegration over a much larger surface than would otherwise occur. As the bar 17, wastes away at its end, the thin skin of marine glue 18, is left unsupported and crumbles away. Such a magnesium bar may be some 6″ to 8″ in diameter, for example.

Fig. IV, illustrates diagrammatically the use of the outermost surface of a steel ship 21, as one electrode in conjunction with one or another of two electrodes 22 and 23. If the ship be made cathode, the anode 22, may be of copper and may be constructed like the anode 12, of Fig. II, and it may be arranged as shown so that the water can pass directly through it as the ship moves, so as to give maximum depolarizing action. Or, if very great power capacity be desired, the anode 22, may be a slab of ordinary battery carbon with holes therein to increase the surface in contact with the sea-water.

If the ship is to be anode, the cathode 23, may be of magnesium protected as above set forth; or if maximum power for a very short time only be demanded, it may be a bare magnesium slab 2″x12″x2″, for example, with a number of ½″ holes.

Of course the electrodes 22 and 23, may be used together to form the battery to the exclusion of the ship's hull.

Fig. V, shows a compact, convenient battery device intended to be thrown overboard for occasional or emergency use; it consists of a pair of thin rectangular electrodes 24, 25, insulatively secured together by struts 26, and provided with current leads 27, 28, which are united and insulated to form a single towing and conductor cable 29. The flat faces of these electrodes being parallel to one another and to the direction of travel through the water, good depolarization is obtained.

The electrode 12, shown in Fig. II, comprises a relatively small amount of metal with a large area of active contact surface condensed into small space in a compact, handy form,—large area of contact surface being relied on for the desired current capacity rather than maximum spread. As here shown, the large area is obtained by giving the metal a foraminous or cellular structure. When the device is arranged as shown, the water of the waves can pass directly through it, so that good depolarizing action is obtained. With such an electrode device of copper having 10,000 square inches of exposed surface, and a zinc cathode 11, 0.96 ampere current can easily be obtained with 0.4 ohm total resistance in the external circuit when the temperature of the sea-water is about 62° F.

In order to give the pole element 12, such a foraminous or cellular structure, it may be built up in a particular way that I have invented and have illustrated in Figs. VI to IX. As will be seen from Fig. VI, the pole element 12, has, in this construction, a frame structure 30, (about 13½″ square) formed of sheet metal strips with inturned edges (see Fig. VI) bolted together at their corners, the ends of opposite strips being curled back on themselves to form tubular sockets 31, adapted (see Fig. II) to fit over the flanged insulating sleeves 32, (of bakelite or the like) which co-act with insulating washers 33, (of similar material) to insulate the pole element from the standards 34, attached to the buoy 10. In this frame structure 30, is a pack of superposed thin metal plates 35, slightly spaced apart (see Fig. VII), and held in place by bolt rods 36, extending through them from side to side of the frame, and also by engagement of their ends in the shallow channels formed by the inturned edges of the frame side plates. By making these plates 35, of 0.096″ sheet copper corrugated to space them apart and increase the interstitial surface, 10,000 square inches or more can easily be obtained with plates only 3″ wide forming a pack about 13″ thick. Washers 37, are preferably interposed between the plates to improve their electrical connection to the bolt-rods 36,—to one of which the current lead 15, is attached (see Fig. II).

While various modes of corrugation will answer the purpose more or less adequately, I prefer to employ such a one as is shown in Figs. VIII and IX. In Fig. VIII, all the short longitudinal lines between light and shaded areas (whether heavy shade lines or not) represent shearing of the metal, and all the transverse lines separating light and shaded areas represent bends in the metal. By a suitable die, the metal may be bent about 22° out of its original plane both up and down at the same time that it is sheared (being, perhaps, also stretched somewhat) along lines extending transversely of the strip as noted above, and lying both at the ends of the shear lines and at the middle of such lines. This is done in such a way that all the light areas lie in the same or parallel planes inclined upward toward the lower edge of the drawing; and all the shaded areas lie in the same or parallel planes inclined downward toward said lower edge. The result is (as will be seen from comparison of Figs. VIII and IX)

that the sheet 35, has a single set of simple trough-like corrugations (of which the plane of the paper is the median plane, as indicated by the dot and dash line 38, of Fig. IX), interrupted or mutilated by two double chain-like sets 39 and 40, of additional corrugations superposed upon them at opposite sides of their median plane 38. It will further be seen that the crests of the main corrugations (as determined from Fig. VIII) form the base-line of the "super-crest" set 39, and that the hollows of the main corrugations form the base-line of the "infra-hollow" set 40. From Fig. VIII, it will be seen that the halves of the double super-crest set 39, are symmetrically arranged with reference to the center of the plate 35, and that adjacent corrugations of each half are offset half their own width with reference to one another, first to one side and then to the other in alternation, so that the set as a whole has a peculiar chain-like appearance. The like is true of the halves of the infra-hollow set 40, which lie outside of the halves of the supra-crest set 39. In addition to "nesting" in such a way as to insure that when two plates 35, are assembled, the crests of their main corrugations shall coincide,—thus in a manner additionally spacing the plates apart,— the extra corrugations 39 and 40, result in zigzag cross openings or passages from top to bottom of the pack of plates and so permit freer circulation of the electrolyte. Also, the interlocking of the extra corrugations 39 and 40, greatly stiffens the whole structure.

It will be understood, of course, that Figs. VI and VII, represent the plates 35, somewhat diagrammatically, since if they were drawn to correspond exactly to Figs. VIII and IX, the reduction of scale would render the interstices between the plates almost invisible. It will also be seen from Fig. VI, that the aggregate of assembled plates in effect constitute a compact cellular or honeycombed body of metal or "grid" with very large exposed surface and provision for very free internal circulation of the electrolyte, as well as direct, straight channels for passage of the electrolyte from side to side through it.

The properties of carbon are such that it is a very difficult matter to make a satisfactory, permanent electrical connection to a sea-battery electrode of this material. As the sea-water must permeate the electrode completely, the initial conductor used for the purpose must itself be of carbon. This carbon conductor must be brought within a watertight space for the attachment of a metallic lead thereto (since the mechanical properties of carbon made such a lead a practical necessity in the great majority of cases), in order that the joint of the metallic lead with the carbon may not be destroyed by local electrolytic action. It is necessary, then, that the water be prevented from entering the water-tight space through the pores of the carbon conductor.

In Fig. X, I have shown a suitable connection for a carbon electrode 45, intended to replace the copper electrode 12, of Fig. II. As here shown, the carbon slab 45, has a portion free of the surface-augmenting holes 46, and into a suitably shaped dovetail socket in this portion the dovetail-ended rectangular carbon conductor rod 47, is tightly wedged,—mechanical tightness being relied upon for electrical connection, as well as for structural stability. This rod 47, extends through a stuffing box 48, in the shell 49, of the buoy. A rubber sleeve 50, on the rod 47, co-acts with the rubber packing 51, of the round stuffing box to accommodate the rectangular rod and to insure perfect water-tightness around the rod. To prevent water from entering through the pores of the rod 47, it is impregnated with suitable material such as tar or pitch,— which may be put into it according to the ordinary process in which the rod is treated in vacuum to remove the air from its pores and heated tar or pitch is admitted to the treating chamber to permeate the rod and fill its pores completely. The current lead 52, is attached at 53, to the end of the rod 47, within the shell 49, according to the usual practice with ordinary battery carbons.

Having thus described my invention, I claim:

1. A galvanic battery comprising electrodes of different potential characteristics immersed in the sea as electrolyte and capable of affording electric power in substantial amount, at least the anode being exposed to the sea water over a large area.

2. A galvanic battery comprising electrodes of different potential characteristics immersed in the sea as electrolyte and capable of affording electric power in substantial amount, the anode being exposed to the sea water over a large area and also freely exposed to washing and depolarization by ordinary relative movement between the anode and the sea water.

3. A galvanic battery comprising a floating structure with electrodes of different potential characteristics immersed in the sea as electrolyte and capable of affording electric power in substantial amount, the anode comprising an exterior wetted metallic surface of said structure exposed to the sea water over a large area.

4. An electrode for a galvanic battery having pole elements of different potential characteristics immersed in the sea as electrolyte and capable of affording electric power in substantial amount by virtue of exposure of the anode to the sea water over a large area, said electrode comprising a body of foraminous metal interstitially exposed to the water.

5. An electrode for a galvanic battery having pole elements of different potential characteristics immersed in the sea as electrolyte and capable of affording electric power in substantial amount by virtue of exposure of the anode to the sea water over a large area, said electrode having a large exposed metallic surface condensed into a small compact space.

6. An electrode for a galvanic battery having pole elements of different potential characteristics immersed in the sea as electrolyte and capable of affording electric power in substantial amount by virtue of exposure of the anode to the sea water over a large area, said electrode consisting of metallic copper.

7. An electrode for a galvanic battery having pole elements of different potential characteristics immersed in the sea as electrolyte and capable of affording electric power in substantial amount by virtue of exposure of the anode to the sea water over a large area, said electrode comprising a body of foraminous copper interstitially exposed to the water and having the property of improving its potential characteristic with exposure to sea water.

8. An electrode for a galvanic battery having pole elements of different potential characteristics immersed in the sea as electrolyte and capable of affording electric power in substantial amount by virtue of exposure of the anode to the sea water over a large area, said electrode comprising a compact cellular metallic grid, with large exposed surface condensed into small compact space.

9. An electrode for a galvanic battery having pole elements of different potential characteristics immersed in the sea as electrolyte and capable of affording electric power in substantial amount by virtue of exposure of the anode to the sea water over a large area, said electrode comprising a pack of superposed thin metal plates slightly spaced apart and having large exposed surface condensed into small compact space.

10. An electrode for a galvanic battery having pole elements of different potential characteristics immersed in the sea as electrolyte and capable of affording electric power in substantial amount by virtue of exposure of the anode to the sea water over a large area, said electrode comprising a pack of superposed, corrugated thin metal plates slightly spaced apart by their corrugations and having large exposed surface condensed into small compact space.

11. A current connection for a carbon sea-battery electrode comprising a carbon conductor secured to the carbon electrode by a carbon wedge connection and extending within a watertight space, said rod being suitably impregnated to prevent entry of water into such space through its pores.

In testimony whereof I have hereunto signed my name at Philadelphia, Pennsylvania, this fifth day of March, 1919.

JOHN K. M. HARRISON.

Witnesses:
 JAMES H. BELL,
 WILLIAM W. AMMEN.